United States Patent
Florio

(10) Patent No.: US 11,864,576 B2
(45) Date of Patent: Jan. 9, 2024

(54) METHOD FOR PREPARING A CANDIED POPCORN

(71) Applicant: PERFECT SNAX, LLC, Windemere, FL (US)

(72) Inventor: Frank Florio, Long Valley, NJ (US)

(73) Assignee: PERFECT SNAX, LLC, Windemere, FL (US)

( * ) Notice: Subject to any disclaimer, the term of this patent is extended or adjusted under 35 U.S.C. 154(b) by 172 days.

(21) Appl. No.: 17/398,523

(22) Filed: Aug. 10, 2021

(65) Prior Publication Data

US 2022/0079193 A1   Mar. 17, 2022

Related U.S. Application Data

(60) Provisional application No. 63/078,041, filed on Sep. 14, 2020.

(51) Int. Cl.
| | | |
|---|---|---|
| *A23L 7/191* | (2016.01) | |
| *A23L 7/183* | (2016.01) | |
| *A23P 30/38* | (2016.01) | |
| *A23P 20/10* | (2016.01) | |

(52) U.S. Cl.
CPC .............. *A23L 7/191* (2016.08); *A23L 7/183* (2016.08); *A23P 20/10* (2016.08); *A23P 30/38* (2016.08); *A23V 2002/00* (2013.01)

(58) Field of Classification Search
CPC .......... A23L 7/191; A23L 7/183; A23P 30/38; A23P 20/10
See application file for complete search history.

(56) References Cited

U.S. PATENT DOCUMENTS

| | | | | |
|---|---|---|---|---|
| 4,457,435 A | * | 7/1984 | Truman | .................... B07B 1/22 |
| | | | | 209/288 |
| 6,200,611 B1 | * | 3/2001 | Ganesan | ................. A23L 7/191 |
| | | | | 426/660 |
| 2014/0272007 A1 | * | 9/2014 | Kanafani | ................ A23L 25/25 |
| | | | | 426/92 |

\* cited by examiner

*Primary Examiner* — Katherine D Leblanc
(74) *Attorney, Agent, or Firm* — Andrew F. Young; Nolte Lackenbach Siegel

(57) ABSTRACT

A method of manufacturing candied popcorn, including providing: a kettle to pop popcorn kernels into popped popcorn; a drum to tumble the popped popcorn and sift out unpopped or undersized popcorn; a hopper to place the popped popcorn onto a tray; a scarf plate; and a drizzle applicator to apply an edible adhesive to the popped popcorn; preparing a volume of popped popcorn using a wet pop technique; transporting a portion of the volume of popped corn to the drum to sift out unpopped or undersized popcorn; placing the popcorn from the drum onto a tray; adjusting the height of the tray relative to a belt and placing the tray onto the belt; applying a first application of the edible adhesive onto the remaining popcorn; passing the remaining popcorn under the scarf plate to receive dry product; applying a second application of the edible adhesive onto the remaining popcorn.

15 Claims, 2 Drawing Sheets

METHOD FOR PREPARING A CANDIED POPCORN

CROSS REFERENCE TO RELATED APPLICATIONS

This application relates to and claims priority from U.S. Ser. No. 63/078,41 filed Sep. 14, 2021, the entire contents of which are incorporated herein by reference.

FIGURE SELECTED FOR PUBLICATION

FIG. 1

BACKGROUND OF THE INVENTION

Field of the Invention

The present invention relates generally to a method for manufacturing of a candied popcorn.

Description of the Related Art

Popcorn, also known as popped corn, is a variety of corn kernel that expands and puffs up when heated. Popcorn is a whole grain that is high in fiber. Whole grains that are high in fiber are known to be healthy foods that lower the risk of heart disease, diabetes, some cancers and other health problems. Another health benefit of popcorn as compared to relatively higher caloric foods, such as chocolate, for an equal volume of food, popcorn has a high level of satiety, i.e., feeling of fullness and the suppression of hunger for a period of time after eating.

Ideally, a person would be able to eat whatever foods they want in whatever quantities they want. Unfortunately, most foods that people desire to eat the most such as chocolate bars, candy, and the like are extremely calorie dense and low in nutritional value. Since such foods have a low level of satiety, there is a tendency to overeat such foods. If only there was some way to extend the pleasurable effects provided by the flavor of such foods without having too great of a caloric consumption.

Fortunately, popcorn has a relatively neutral flavor, which provides an essentially blank canvas that can be flavored with relatively less healthy, higher caloric, flavorful, and/or expensive ingredients. This is an advantageous property of popcorn that means that it is possible to flavor a quantity of popcorn with a relatively lesser quantity of another food product so that the entire combination of popcorn and food product essentially carry the flavor of the food product.

This combined product of popcorn and food product depends on a flavor enhancement technique known as mouthfeel, which is a multidimensional oral sensation that depends on the totality of the food characteristics, such as food texture and the distribution of flavors. Depending on how the food flavorings are distributed, it is possible to create a mouthful of a relatively large volume of flavor while using an amount of flavoring that is less than that perceived or experienced when eating the food.

The present invention provides a commercially viable method of affixing candy such as M&Ms and the like to popcorn that combines the positive health benefits of popcorn, particularly, the feeling of satiety it creates along with the flavors of popular candy or chocolate products. This means that a user can experience both satiety in terms of satisfying both hunger and taste that would be unachievable when only eating the candy or chocolate or the unflavored popcorn alone.

Popcorn or popped corn is a variety of corn kernel that expands and puffs up when heated. A popcorn kernel's strong hull contains the seed's hard, starchy shell endosperm with 14-20% moisture, which turns to steam as the kernel is heated. Pressure from the steam continues to build until the hull ruptures, allowing the kernel to forcefully expand, from 20 to 50 times its original size, and then cool. While it is technically possible for popcorn kernels to pop at 100 degrees Centigrade (212 degrees Fahrenheit), it is more likely to pop at higher temperatures, usually around 150 degrees Centigrade (302 degrees Fahrenheit) because the water rapidly heats up and steam does not have much time to escape, instead bursting open the kernel and popping.

The melting point of chocolate is approximately between 30 and 32 degrees Centigrade (86- and 90-degrees Fahrenheit) and the melting point of caramel is approximately between 51 and 66 degrees Centigrade (125- and 150-degrees Fahrenheit) such that each is pourable. In contrast, most commercially manufactured chocolate has a melting point between 16 and 37 degrees Centigrade (60.8- and 98.6-degrees Fahrenheit), which is slightly below that of average body temperature (37 degrees Centigrade or 98.6 degrees Fahrenheit). At room temperature, which is approximately between 18 and 21 degrees Centigrade (65- and 70-degrees Fahrenheit), chocolate will harden within 3 to 5 minutes.

Candied chocolates like M&M®s, for example, are known to "melt in your mouth, but not in your hand" as the candied exterior slows down the rate at which the candied chocolate can melt. In fact, M&M®s were first sold as a product for soldiers in WWII because the candy could withstand hotter climates and could be easily transported. The candied outer shell, which is mostly sugar, is water soluble and thus begins to dissolve when it interacts with the saliva in the mouth.

In heat, alone, however, the melting point of chocolate is significantly lower than that of sugar. Sugar begins to decompose at about 160 degrees Centigrade (320 degrees Fahrenheit) and will dissolve in approximately 8 to 10 minutes without stirring. Sugar does not have a definitive melting point because it decomposes, i.e., breaks into simpler compounds, and it will decompose faster at higher temperatures than it will at lower temperatures. It does not melt and re-solidify at definitive and predictable temperatures.

Making a commercially viable popcorn that has "dry product," e.g., candy and/or chocolate bar products (e.g., M&M®s, bits of SNICKERS®, TWIX®, etc.) affixed to the popcorn is challenging in numerous ways and the present invention overcomes such challenges in several ways that will be discussed herein. Whatever means are used to affix the candy or chocolate bar products needs to be edible as well, for example, by the present invention, a chocolate and/or a caramel and/or the like can be drizzled to secure the candy and/or chocolate bar products to the popcorn.

As can be appreciated, the various temperatures that are required to pop popcorn could also result in damage to the candy and/or chocolate bar products. For example, in some circumstance, it would be desirable for the candy and/or chocolate bar product to retain its original appearance. For example, if heat is applied too long at too high of a temperature to M&M®s, they may become deformed and/or not be otherwise visually appealing.

In addition, it may be desirable for health and other reasons that only a drizzle of the affixing food product, e.g., chocolate and/or caramel be applied to the popcorn to minimize unnecessary calories. For example, the mouthfeel created by entirely coating a popcorn with the affixing product may not necessarily be greater than that of only drizzling some of the affixing product upon to the popcorn. However, the candy and/or chocolate bar products would need to contact the affixing product to be secured to the popcorn. It is advantageous that both during the production and during the storage of the product that as much of the candy and/or chocolate product become and remain affixed to the popcorn.

It is to be understood that this background section is provided to facilitate and understanding of the present invention, and nothing discussed in here should be construed as any admission of prior art. The present invention overcomes at least some of the challenges that are discussed hereinabove by way of background.

ASPECTS AND SUMMARY OF THE INVENTION

The present disclosure relates to a method of manufacturing candied popcorn, including providing: a kettle configured to pop popcorn kernels into popped popcorn; a drum configured to tumble the popped popcorn and to sift out unpopped or undersized popcorn; a hopper configured to place the popped popcorn onto a tray; a scarf plate; and at least one drizzle applicator configured to apply at least one edible adhesive to the popped popcorn; preparing a volume of popped popcorn using a wet pop technique; transporting at least a portion of the volume of popped corn to the drum to sift out unpopped or undersized popcorn; placing the remaining popcorn from the drum onto a tray; adjusting the height of the tray relative to a manufacturing belt and placing the tray onto the manufacturing belt; applying a first application of the at least one edible adhesive onto the remaining popcorn; passing the remaining popcorn under the scarf plate to receive dry product; applying a second application of the at least one edible adhesive onto the remaining popcorn; cooling the remaining popcorn; and packaging the remaining popcorn.

Enrobing in the confectionery industry refers to a process that involves covering a confection or snack with chocolate or chocolate coatings, e.g., compound coatings that are made from a combination of cocoa, vegetable fat, and sweeteners. Examples of enrobed products include chocolate covered nuts, wafer bars, ice cream, etc. As shown in FIG. 2, an enrober may include a sump 1, a bottomer 2, a flow part 3, a riser tank 4, a blower 5, a wire belt 6, a licking roller 7, a de-tailing rod 8, a shaker 9, and a heated extension trough 10. Processing a chocolate typically requires a tempering unit. The centers (the object to be enrobed by chocolate) are typically maintained at 21 to 24 degrees Centigrade and the enrobing chocolate preferably has the desired viscosity and rheological properties (i.e., material properties in which the material deforms or flows in response to applied forces or stresses. The centers must be kept within a particular temperature range because cold centers can lead to blooming and cracking of the coating shell due to expansion of the center mass as it warms, and the coating medium is to be maintained at a constant temperature and in an agitated tank to maintain desired viscosity until it is pumped to a flow pan, which aids in the process by creating a continuous curtain of coating and feeding a bottoming device. This leads to the formation of a bed coating, which floods the mesh band. The flow properties of chocolate or compound such as viscosity are dependent on many variables including speed of flow, yield value (i.e., shear stress required to initiate flow of a coating).

The centers are passed through this curtain and bed and are typically covered on all surfaces. After the curtain, excess chocolate is forced off the product by an air blower and a licking roller is used to control the amount of mass left on the underside of the sweet. There is normally a vibrator that vibrates the sweet after the blower to remove excess chocolate and to improve the appearance of the sweet. Excess mass from the curtain falls through the wire mesh belt into a sump and is recirculated. As the centers are discharged from the enrober on to a cooling conveyor, they pass over a de-tailer which is a rapidly spinning rod across the end of the wire band to remove the tail as the center leaves the wire band.

After enrobing, the product enters a cooling tunnel to allow the coating to harden. To avoid blooming problems, temperature changes in the tunnel should be gradual, and the relative humidity should be properly controlled. For example, if the dew point is lower than room temperature, moisture could condense on the product and cause sugar bloom during storage. The chocolate coating and the filling are typically cooled down to approximately 18 degrees Centigrade to ensure trouble-free packaging, for example. A good cooling tunnel is typically divided into three zones: Zone 1: For roughly 1 minute, between roughly 32 and 25 degrees Centigrade; Zone 2: For roughly 3 minutes, between 25 and 20 degrees Centigrade; Zone 3: For a few minutes, between 20 and 15 degrees Centigrade. In Zone 1, in the tunnel inlet, only sensitive heat is removed from the center and/or the chocolate coating. In Zone 1, recommended heat transfer is by air circulation around the product, i.e., convection. In Zone 2, for approximately 3 minutes, the crystal growth is started. Up to this point, gentle cooling is required. Latent heat is removed from the chocolate. The recommended heat transfer is by exchange without air circulation, i.e., radiation. In Zone 3, both sensitive and latent heat is removed in the tunnel outlet.

Cooling is one of the biggest challenges of enrobing a product with chocolate as both the product and the enrobing chocolate or compound are highly susceptible to temperature changes as if temperature ranges are not maintained at the desired levels, the product and/or enrobing chocolate or compound may not look aesthetically pleasing or may have other defects.

The above and other aspects, features and advantages of the present disclosure will become apparent from the following description read in conjunction with the accompanying drawings, in which like reference numerals designate the same elements. Unless noted otherwise, nothing in the foregoing background section should be construed as prior art as it is intended to merely provide background in the understanding of the present disclosure.

BRIEF DESCRIPTION OF THE DRAWINGS

A further understanding of the present disclosure can be obtained by reference to a preferred embodiment set forth in the illustrations of the accompanying drawings. Although the illustrated preferred embodiment is merely exemplary of methods, structures and compositions for carrying out the present invention, both the organization and method of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems, compositions and operating structures in accordance with the present invention may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Figure 1:
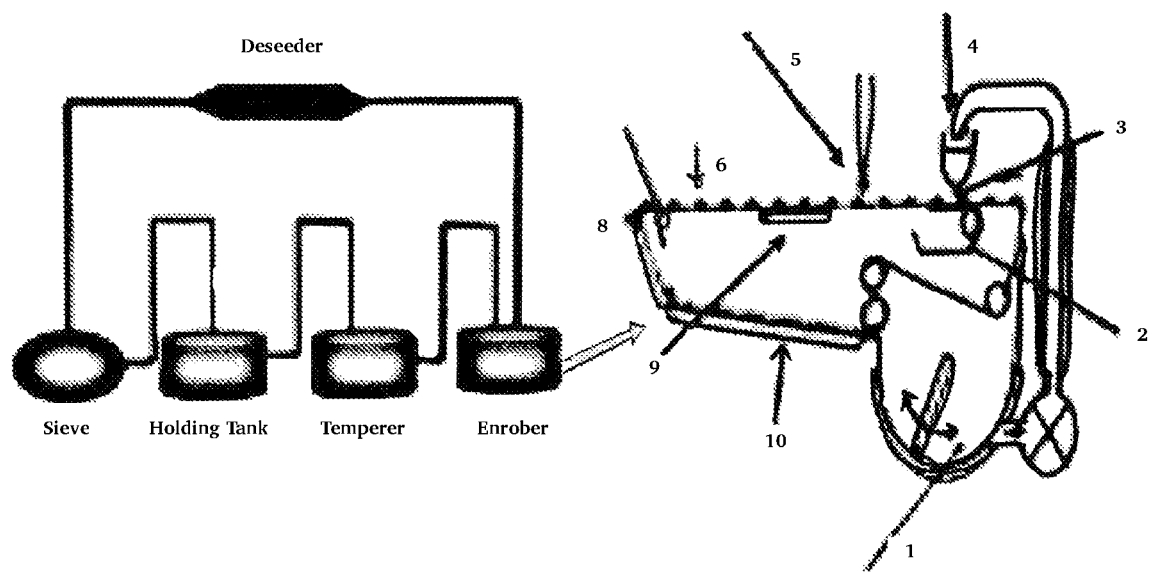
FIG. 1 is a basic layout of an enrobing line and components of an enrober in accordance with prior art.

A method of manufacturing a candied popcorn is now described with reference to FIG. 2. The method of manufacturing the candied popcorn is similar in some respects to the process that was described with respect to FIG. 1 of enrobing candies or nuts or the like with chocolate or chocolate compound. However, in the present method, the popcorn may not be entirely enrobed with chocolate or chocolate compound. Rather, the popcorn is drizzled with the chocolate or chocolate compound and this chocolate or chocolate compound functions as an adhesive to adhere product (e.g., M&Ms or the like) to the popcorn and then a subsequent drizzle of the chocolate or chocolate compound is then drizzled again to ensure that loose product does not detach from the popcorn. For some of the reasons noted above, drizzling a second drizzle of the chocolate or chocolate compound onto the candied popcorn (i.e., the already drizzled popcorn having product adhered to it) is a process that is complicated because of the tight ranges of temperatures and other characteristics that determine the flow properties of the chocolate or chocolate product, the preferable cooling times, and a multitude of other factors involving temperatures and timing, etc.

Figure 2:
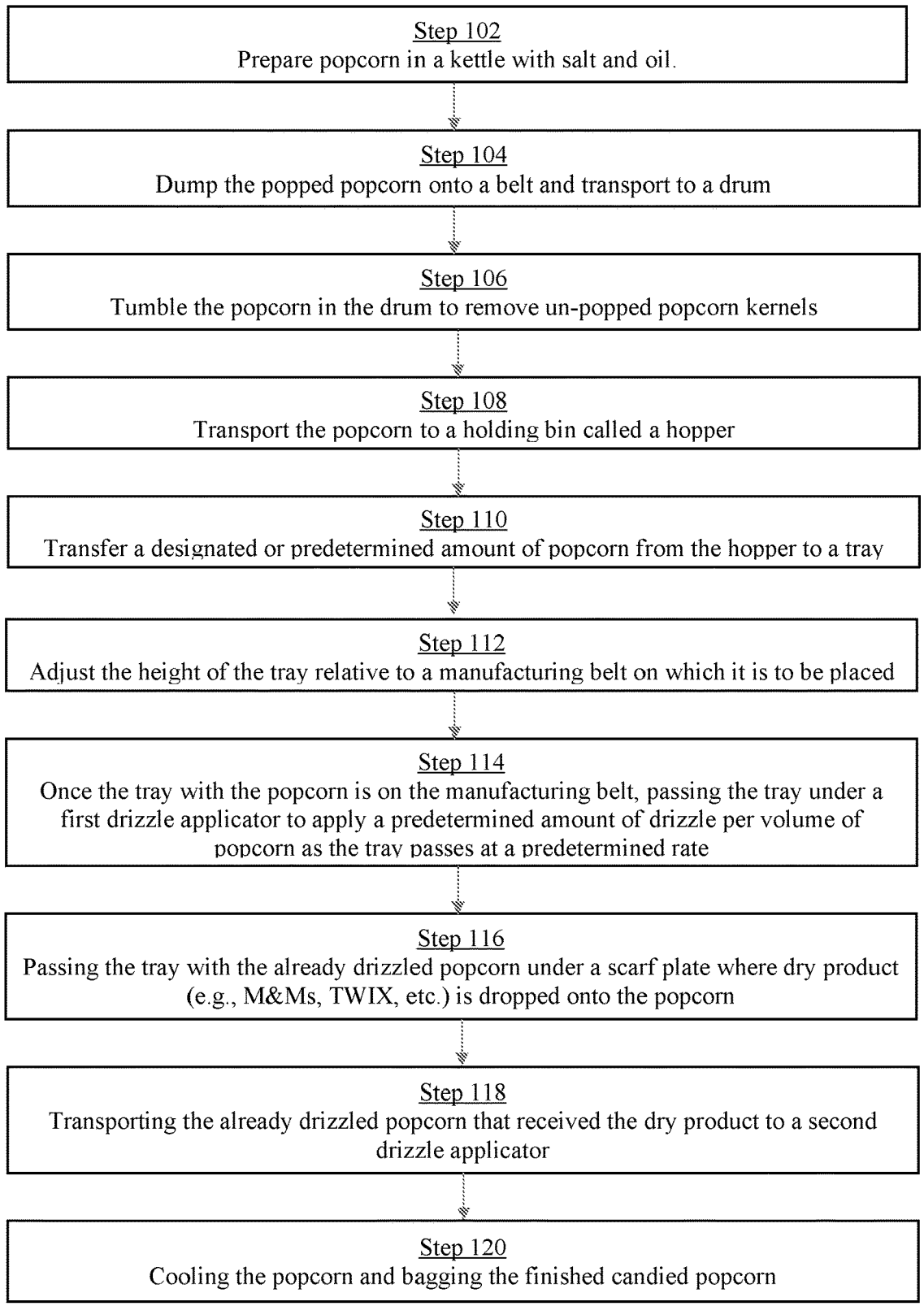
FIG. 2 is a flowchart of an embodiment of a process in accordance with the present disclosure.

As shown in FIG. 2, a method of preparing candied popcorn 100 may include a step 102 of preparing popcorn in a kettle. Preferably, the popcorn is prepared with salt and oil being added during the popping process. This is often referred to as a wet pop.

After the kernels have popped, at step 104, the popcorn is transported to a drum on a belt and transported to a drum. At step 106, the popcorn that is placed in the drum is tumbled such that unpopped and small popped kernels (known as 'old maids') are removed. At step 108, the remaining popcorn in the drum, is transported to a holding bin called a hopper, i.e., a container for a bulk material such as grain, rock, or trash, typically one that tapers downward and is able to discharge its contents at the bottom. At step 110, a designated or predetermined amount of popcorn is transferred from the hopper to a tray.

Prior to being transferred to a manufacturing belt, at step 112, the height of the tray on which the popcorn was placed may be adjusted so that the tray is at an appropriate height for the popcorn that is on the tray to have dry product (e.g., crushed candy, candy bars, M&M®s and/or the like) adhered to the surface of the popcorn during the next steps.

Once the tray is adjusted to an appropriate height, at step 114, the popcorn is taken to a first drizzle applicator or enrober that applies a predetermined amount of drizzle per volume of popcorn or other item at a predetermined rate, e.g., edible adhesive, which may be sugar, chocolate, and/or caramel or the like. This first drizzle applicator provides a flavor profile and/or provides a sticky surface for dry product (e.g., crushed candy, candy bars, M&M®s and/or the like) to adhere to during the next step of application of dry product at step 116. At step 116, the popped corn passes under a scarf plate, which is a vibratory dry ingredient distributer such that the dry product is dropped onto the item and relatively evenly distributed amongst the popped corn. The popcorn may travel on a conveyor, at a bed depth of ¾ of an inch (0.75") to one and half inches (1.5") and spread across the conveyor, which may be 40 to 50 inches wide under the first enrober, which may dispense 15 to 20 grams of compound coating (e.g., chocolate coating or other coatings of various flavors). This first application of compound coating functions as a glue or an adhesive. After the popcorn has a fine string of coating applied, a first topping (e.g., candy or cookie pieces) is applied to the popcorn such that the coating functions as a wet glue in which the toppings are at least partially sunk into the coating. If applicable, a second topping, e.g., peanuts or other cookie pieces, may be subsequently applied to the already candied popcorn.

At step 118, the popcorn that has already had both dry product and drizzle applied to surfaces is placed under a second drizzle applicator or enrober that has a set amount of drizzle per volume of popcorn. This also adds the same and/or difference flavor profile. For example, the first drizzle application may be chocolate and the second drizzle application may be caramel. Additionally, the second drizzle application inhibits the already adhered dry product from dislodging or separating from the popcorn. This second application of compound coating is another 15 to 20 grams that is applied on top of the partially sunk pieces of the toppings, and this adds weight to depress the toppings further into the compound and also applies additional coating that functions as another adhesive or glue on top of the partially loose pieces. If only a first coating were applied and a second coating were not applied to further depress the toppings into the coating and to further glue the toppings to the popcorn, it is estimated that approximately 50 percent of the toppings would separate from the popcorn. Thus, this second step 118 of adhesion is advantageous. However, because of the heat of the coating and the timing relative to cooling of the first coating, this second step 118 of adhesion differs from conventional enrobing described with respect to FIG. 1, in which a second enrobing step would not have been performed because the product would have already cooled and the temperatures would affect the look of the enrobing chocolate such that it may no longer look glossy or the fat contained within the compound may have bloomed, etc.

Thereafter, the popcorn cools as it is transported a distance of at least 40 feet at room temperature (approximately 72 degrees Fahrenheit or 22 degrees Centigrade) such that the drizzle applications harden, and at step 120, the popcorn is bagged. The bed of popcorn, which now has two strings of coating and up to two toppings travels into the cooling tunnel at step 120 and the cool temperatures make the compound harden almost immediately which creates the adhesive effects desired. The cooling tunnel length may range, for example, from 30 to 55 feet in length and may be a two-zone cooling tunnel and may range in temperature, for example, between 35 and 65 degrees, depending on the coating, the length of the tunnel and the weight of the toppings. The popcorn may be in the cooling tunnel from 3 to 8 minutes depending on the length of the tunnel and the temperatures used. The final product, including the popcorn, the coatings, and the applied toppings/product (e.g., M&Ms) may be 42 to 56% coatings and toppings/product with the remainder being popcorn.

When the popcorn reaches the top of the bagging process it is dropped onto large metal plates each of these plates can weigh how much popcorn is on it. If the bagger is set to 20 oz the plates that add up to 20 oz will open and drop the popcorn down so it can be bagged. Once bagged and sealed the final product is put into cases or onto pallets.

Having described at least one of the preferred embodiments of the present invention with reference to the accompanying drawings, it is to be understood that such embodiments are merely exemplary, and that the invention is not limited to those precise embodiments, and that various changes, modifications, and adaptations may be affected therein by one skilled in the art without departing from the scope or spirit of the invention as defined in the appended claims. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A method of manufacturing candied popcorn, comprising the steps of:
   providing:
      a kettle configured to pop popcorn kernels into popped popcorn;
      a drum configured to tumble the popped popcorn and to sift out unpopped or undersized popcorn;
      a hopper configured to place the popped popcorn onto a tray;
      a scarf plate configured to distribute a first dry-ingredient coating onto the popped popcorn;
      a first drizzle applicator configured to apply a first layer of an edible adhesive to the popped popcorn; and
      a second drizzle applicator configured to apply a second layer of edible adhesive to the popped popcorn;
   the kettle preparing a volume of popped popcorn using a wet pop technique;
   the drum sifting out unpopped or undersized popcorn;
   the hopper transferring a predetermined amount of the sifted popcorn onto a tray;
   adjusting the height of the tray relative to a manufacturing belt and placing the tray onto the manufacturing belt;
   the manufacturing belt passing the tray under the first drizzle applicator to enrobe the sifted popcorn with the first layer of edible adhesive while the sifted popcorn is maintained within a desired temperature range;
   the manufacturing belt passing the tray under the scarf plate to coat the enrobed popcorn with the first dry-ingredient coating while the popped popcorn is maintained within the desired temperature range;
   the manufacturing belt passing the tray under the second drizzle applicator to enrobe the previously enrobed and dry-ingredient coated popcorn with the second edible adhesive-while the previously enrobed and dry-ingredient coated popcorn is maintained within the desired temperature range;
   cooling the now twice enrobed, dry-ingredient coated popcorn;
   packaging the twice enrobed, dry-ingredient coated popcorn; and
   wherein 42% to 56% of the twice enrobed, dry-ingredient coated popcorn consists of the edible adhesives and the dry ingredient with the dry ingredient captured between the first and second layers of edible adhesive.

2. The method claim 1, wherein the desired temperature range is 21 to 24 degrees Centigrade.

3. The method claim 1, wherein the cooling comprises reducing the temperature of the twice enrobed, dry-ingredient coated popcorn to at least 18 degrees Centigrade.

4. The method claim 1, wherein the scarf place comprises a vibratory distributor dropping the dry ingredient onto the popped popcorn.

5. The method claim 1, wherein the tray carries the sifted popcorn at a bed depth of 0.75 to 1.5 inches and a width of 40 to 50 inches.

6. The method claim 5, wherein the first drizzle applicator dispenses 15 to 20 grams of the first edible adhesive.

7. The method claim 6, wherein the second drizzle applicator dispenses 15 to 20 grams of the second edible adhesive.

8. The method claim 7, wherein the dry ingredient comprises crus candy or crushed candy bars.

9. The method claim 8, wherein the first and second layers of edible adhesive comprise the same type of edible adhesive.

10. The method claim 8, wherein the first and second layers of edible adhesive comprise different types of edible adhesive.

11. The method claim 8, wherein the first and second layers of edible adhesive comprise chocolate.

12. The method claim 8, wherein the first layer of edible adhesive comprises chocolate and the second layer of edible adhesive comprises caramel.

13. A method of manufacturing candied popcorn, comprising the steps of:
   enrobing popcorn with a first layer of edible adhesive while maintaining the popcorn within a desired temperature range;
   coating the enrobed popcorn with a dry ingredient while maintaining the enrobed popped popcorn within the desired temperature;
   enrobing the previously enrobed dry-ingredient coated popcorn with a second layer of edible adhesive while maintaining the previously enrobed dry-ingredient coated popcorn within the desired temperature range;
   cooling the twice enrobed, dry ingredient coated popcorn;
   packaging the twice enrobed, dry ingredient coated popcorn; and
   wherein 42% to 56% of the twice enrobed, dry ingredient coated popcorn consists of the edible adhesives and the dry ingredient with the dry ingredient captured between the first and second layers of edible adhesive.

14. The method claim 13, wherein coating the enrobed popcorn comprises passing a tray containing the enrobed popcorn under a vibratory scarf plate distributor that drops the dry ingredient onto the enrobed popcorn.

15. The method claim 13, wherein:
   the desired temperature range is 21 to 24 degrees Centigrade;

the cooling comprises reducing the temperature of the twice enrobed, dry-ingredient coated popcorn to at least 18 degrees Centigrade.

\* \* \* \* \*